United States Patent
Jung

[19]

[11] Patent Number: 5,808,864
[45] Date of Patent: Sep. 15, 1998

[54] PERSONAL COMPUTER WITH DISK DRIVE MOUNTING STRUCTURE

[75] Inventor: Hae-Soo Jung, Suwon, Rep. of Korea

[73] Assignee: SamSung Electronics Co., Ltd., Suwon, Rep. of Korea

[21] Appl. No.: 748,958

[22] Filed: Nov. 13, 1996

[30] Foreign Application Priority Data

Nov. 16, 1995 [KR] Rep. of Korea ................... 1995 33930

[51] Int. Cl.⁶ ............................ G06F 1/16; G11B 33/08; H05K 7/16
[52] U.S. Cl. ........................................................ 361/685
[58] Field of Search ........................ 364/708.1; 361/683, 361/685, 725–727

[56] References Cited

U.S. PATENT DOCUMENTS

| | | | |
|---|---|---|---|
| 5,136,466 | 8/1992 | Remise et al. | 361/685 |
| 5,136,468 | 8/1992 | Wong et al. | 361/683 |
| 5,227,954 | 7/1993 | Twigg . | |
| 5,311,455 | 5/1994 | Ho | 364/708.1 |
| 5,327,323 | 7/1994 | Yeom et al. . | |
| 5,332,306 | 7/1994 | Babb et al. . | |
| 5,398,157 | 3/1995 | Paul | 361/684 |
| 5,485,348 | 1/1996 | Oros . | |
| 5,488,538 | 1/1996 | Wakita . | |
| 5,502,604 | 3/1996 | Furay | 361/685 X |
| 5,517,373 | 5/1996 | Hanson . | |
| 5,524,104 | 6/1996 | Iwata et al. . | |
| 5,552,946 | 9/1996 | Bicknese et al. . | |
| 5,557,499 | 9/1996 | Reiter et al. . | |
| 5,563,767 | 10/1996 | Chen . | |
| 5,566,383 | 10/1996 | Gildea et al. | 361/685 |

*Primary Examiner*—Michael W. Phillips
*Attorney, Agent, or Firm*—Robert E. Bushnell, Esq.

[57] ABSTRACT

An integrated personal computer with a disk drive mounting structure which is easy to upgrade and maintain and which can minimize disk drive mounting space, the structure comprising a chassis including front and rear plates and first and second longitudinal brackets fixedly disposed between the front and rear plates, and guide rails formed on a front side of each of the first and second brackets to slidably carry a first disk drive on the guide rails. The structure further includes rotating mechanism for rotatably carrying a second disk drive on a rear side of each of the first and second brackets. With this rotating mechanism, when rotating the second disk drive toward an outer side in an upright position, it is easy to fix or upgrade a main board disposed under the second disk drive.

21 Claims, 2 Drawing Sheets

PERSONAL COMPUTER WITH DISK DRIVE MOUNTING STRUCTURE

CLAIM OF PRIORITY

This application makes reference to, incorporates the same herein, and claims all benefits accruing under 35U.S.C. §119 arising from an application for Integrated Personal Computer With Improved Drive Kit Mounting Structure earlier filed in the Korean Industrial Property Office on 16 Nov., 1995 and there duly assigned Serial No. 33930/1995.

FIELD OF THE INVENTION

The present invention relates to a personal computer and, more particularly, to a personal computer with an improved disk drive mounting structure that minimizes the volume occupied by a disk drive while facilitating access to components of the computer mounted beneath the disk drive.

BACKGROUND OF THE INVENTION

Since a monitor and a main body are integrated by a single case, an integral personal computer has the advantage of reducing the space used by the computer and making handling easy. The integral personal computer also has a disadvantage however attributable to its inherent compactedness and the concomitant difficulty in maintaining and upgrading the computer compared to a separated computer. To solve the above-described disadvantage, a structure in which disk drives are slidably mounted on the chassis of the housing for a computer has been proposed. In this structure however, if two disk drives are disposed linearly on the same plane, for example, when a floppy disk drive is disposed on a front side and a hard disk drive is disposed on a rear side of the chassis, it is not easy to remove either of the disk drives from the chassis. In addition, there are provided elastic buffers for preventing the disk drive from shaking when mounting the disk drive as well as a guide rail for slidably mounting the disk drive. Also, much more space for mounting the disk drive is required.

The art has sought to accommodate more than one disk drive within the chassis, as shown by U.S. Pat. No. 5,524, 104 for a Compact Disk Drive Arrangement With One Disk Mounted On Top Of Another to Iwata et al. '104, U.S. Pat. No. 5,517,373 for a Disk Drive System With Plural Removable Carrier-Disk Drive Modules to Hanson, and U.S. Pat. No. 5,557,499 for a Hard-Disk Drive Tray Assembly With Pivotally Rotatable Front Bezel to Reiter et al. each providing a computer unit accommodating multiple disk drives in a computer chassis. Recent efforts in the design of chassis such as those represented by U.S. Pat. No. 5,566,383 for a Drive Platform Assembly With Rotatable Mounting Brackets and Automatic Grounding Bracket to Gildea et al., provides a mounting assembly for a pair of disk drives where the disk drives are pivoted about one end during assembly and disassembly by use of two separate mechanisms for pivotally attaching the two different disk drives to the personal computer. The floppy disk drive is attached to the chassis of the personal computer by L-shape mounting tabs extending from the base of the personal computer into notches on the floppy disk drive.

U.S. Pat. No. 5,311,455 for a Portable Computer Having A Hard Disk Drive Mounted Therein to Ho discloses a pivotally mounted hard disk drive in a notebook computer using a pivoting mechanism install and remove the hard disk drive from the personal computer.

Other designs for disk drive mounting arrangements are represented by U.S. Pat. No. 5,398,157 for a Snap-In Mounting Bracket For A Computer Memory Device to Paul uses a snap-in mounting bracket arrangement for attaching a disk drive onto a computer while U.S. Pat. No. 5,563,767 for a Drawer Type Hard Diskdrive Adaptor to Chen provides a hard disk drive that is slid into the personal computer between a pair of guide rails and U.S. Pat. No. 5,502,604 for a Disk Drive With Rail Mounting Arrangement to Furay, U.S. Pat. No. 5,552,946 to a Compliant Rail For Shock Protection Of A PCMCI DASD to Bicknese et al., U.S. Pat. No. 5,327,323 for a Hard Disk Compatible System Including Bracket, Guide Rails, and Interface Board to Yeom et al., and U.S. Pat. No. 5,332,306 for a Computer Disk Drive Mounting Apparatus to Babb et al., each describe computers where the disk drives are inserted and removed from the chassis via a pair of rails.

I have found that contemporary practice in the art, as represented by these references, fail to provide a simple, reliable disk drive assembly with the disk drive pivoted about a mounting bracket to permit for better access to other electrical components while the rotatably mounted disk drive is in an upright position.

SUMMARY OF THE INVENTION

In view of the foregoing, it is an object of the present invention to provide an improved integrated computer.

It is another object to provide an integrated personal computer with disk drive mount that permits easy access to portions of the mother board positioned beneath the disk drive which is easy to upgrade and maintain.

It is still another object to provide an integrated personal computer with an improved disk drive mounting structure that minimizes the volume occupied by the mechanism for pivotally mounting a disk drive within the housing of a computer.

These and other objects are realized in accordance with the present invention by a personal computer with an improved disk drive mounting structure, that uses a chassis including front and rear plates and first and second longitudinal brackets disposed between the front and rear plates; and guide rails formed on a front side of each of the first and second brackets to slidably carry a first disk drive on to the guide rails.

A major feature of this structure enables rotatably inserting a second disk drive unit on a rear side between the first and second brackets. By this feature, when rotating the second disk drive into an upright position to one side of the personal computer, access is provided easy to fix or upgrade a main circuit board disposed under the second disk drive unit.

According to the present invention, the mount for the disk drive is constructed with flanges protruding from opposite sides of the second disk drive, a longitudinal hole formed on the second bracket into which one flange is rotatably inserted, and a locking lug and hole combination formed on the second flange on the first bracket. By inserting the locking lug and hole combination when the disk drive is mounted, vibration of the disk drive can be prevented. A lower side of the longitudinal hole of the second bracket is then forced toward the inside such that a longitudinal protrusion can be formed. When the second disk drive is displaced into an upstanding position by its rotation about the longitudinal hole, a lower end of the first flange is engaged with the protrusion, and maintains the second disk drive in an upstanding position.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
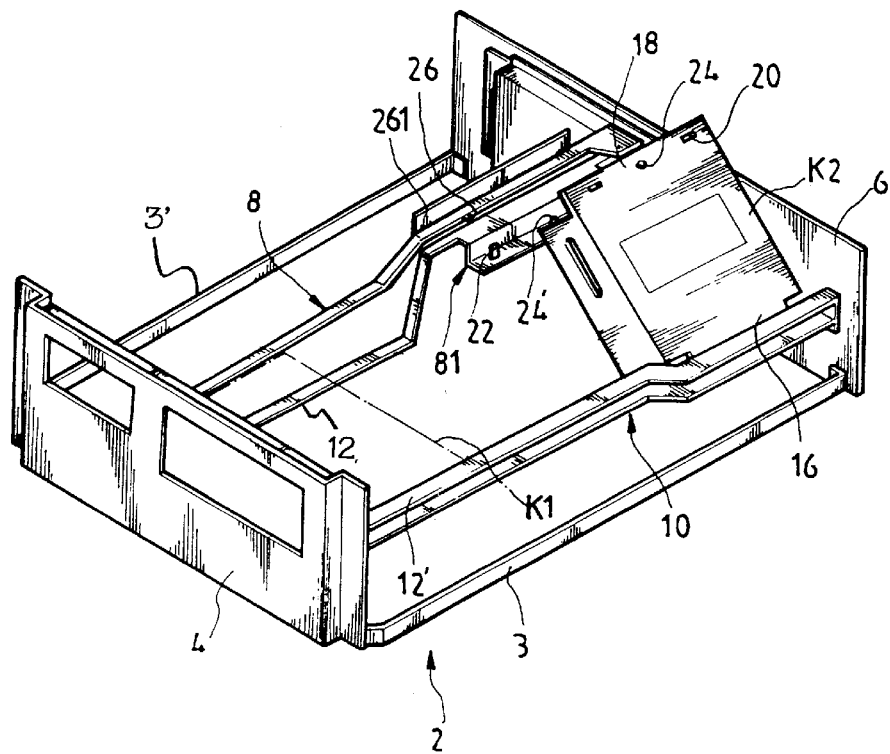
FIG. 1 is a perspective view illustrating a chassis where a disk drive is mounted in a personal computer in accordance with the present invention.
Figure 2:
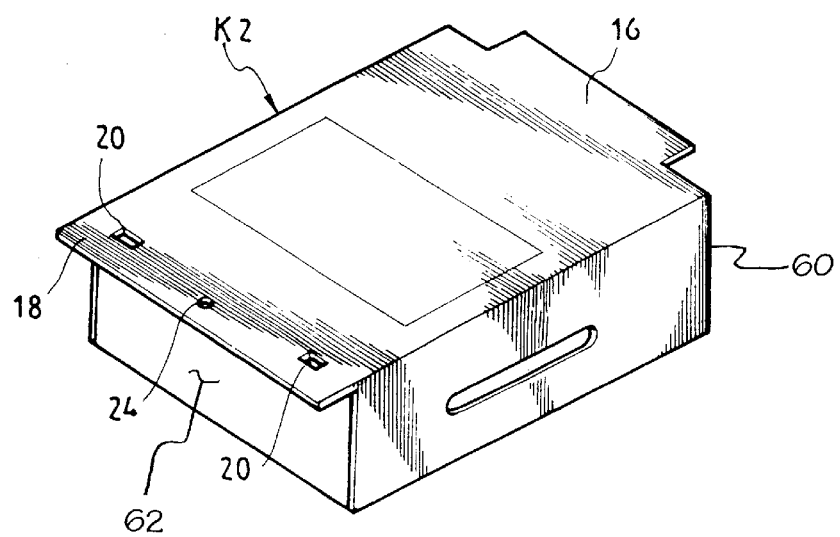
FIG. 2 is a perspective view illustrating the rotatable disk drive in accordance with a preferred embodiment of the present invention.

Reference will now be made in detail to the present preferred embodiment of the invention, an example of which is illustrated in the accompanying drawings. Wherever possible, the same reference numbers will be used through out drawings to refer to the same or like parts and the description thereof will be omitted herein.

Referring to FIGS. 1 to 4, there is shown a perspective view of a chassis 2 where disk drives K1 and K2 are mounted according the principles of the present invention. The chassis 2 has front and rear vertical end walls formed by plates 4 and 6 respectively which are connected to each other by at least two stringers 3 and 3'. Longitudinal brackets or members 8 and 10 are also extend between the front and rear plates 4 and 6. On the front side of the brackets 8 and 10, guide rails 12 and 12' are formed such that the disk drive K1 can be slidably carried thereon.

According to a major feature of the present invention, on the rear side of the brackets 8 and 10, a bracket assembly enables disk drive K2 to rotate to the side of the chassis when fixing or upgrading the system. Bracket 10 has a top side 32, and a bottom side 34. According to a preferred embodiment of the present invention, the rotating means includes a longitudinal hole 14 formed on a portion of the bracket 10 where the first side 60 of the disk drive K2 is positioned.

The disk drive K2 is provided on first side 60 with an inserting flange 16 inserted into the longitudinal hole 14, and on its opposite side, the second side 62, there is provided a locking flange 18 on which a pair of screwholes 24 and 24' and lugholes 20.

On a portion of the bracket 8 where the locking flange 18 is positioned, a disk drive supporting plate 81 is formed. The disk drive supporting plate 81 is provided with a pair of locking lugs 22 corresponding to the pair of locking holes 20 formed on the locking flange 18 so as to prevent vibration of the disk drive K2. In addition, to further enhance the secure fixing of the disk drive, screw holes 24 and 24' are provided on the locking flange 18 and the supporting plate 81 respectively.

Figure 3:
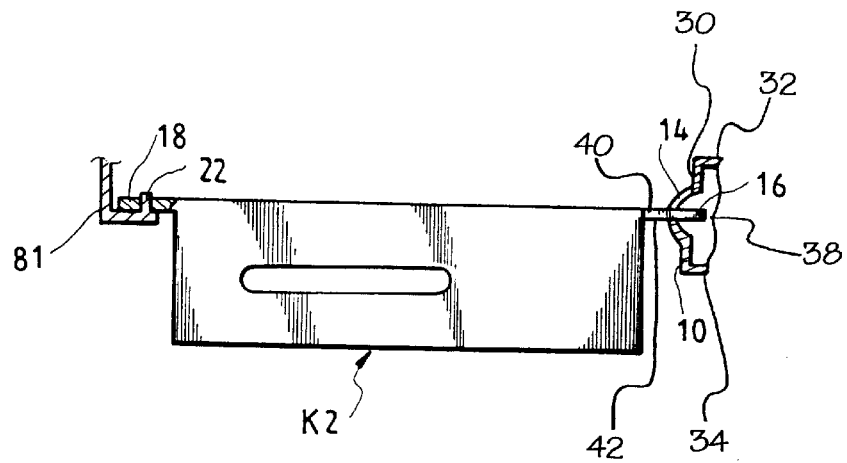
FIGS. 3 and 4 are views illustrating respectively rotational positions of the rotatable disk drive in accordance with a preferred embodiment of the present invention.

Referring to FIG. 3, there is shown a partial sectional view of a disk drive mounting structure according to a preferred embodiment of the present invention. As can be seen, the inserting flange 16 of the disk drive K2 is rotatably inserted into the longitudinal hole 14 formed on the bracket 10, and the lugs 22 formed on the plate 81 of the bracket 8 are inserted into the locking hole 20 formed on the locking flange 18.

Figure 4:
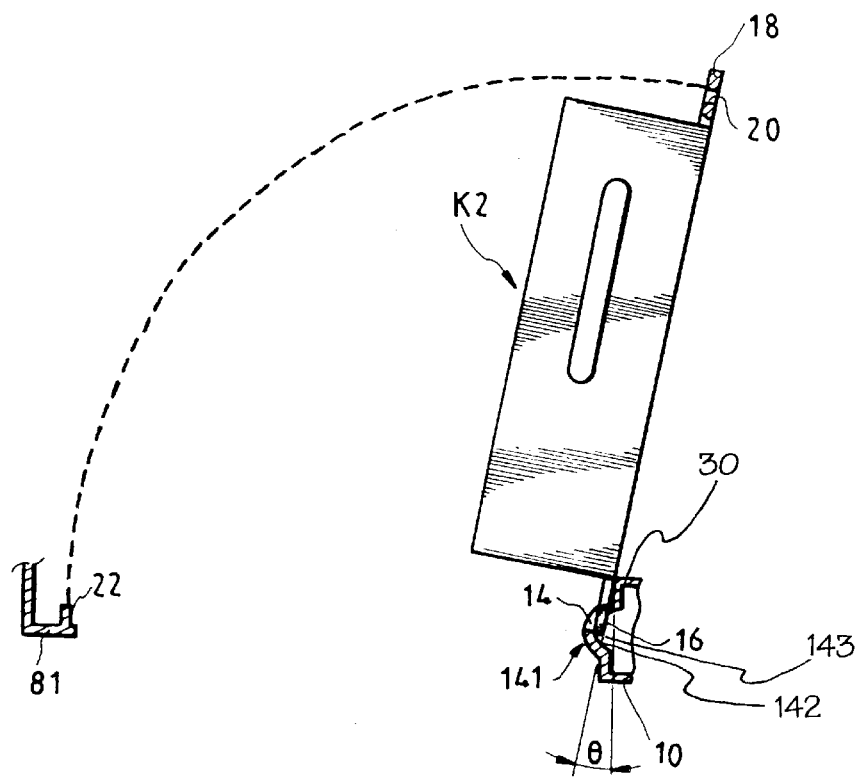

In this state, as shown in FIG. 4, when a user rotates the disk drive K2 toward the outside in an upright position about the longitudinal hole 14 intending to repair or upgrade a main board disposed under the disk drive K2, the locking holes 20 are first disengaged from the locking lug 22. After rotating disk drive K2 to an upstanding position, to maintain the upstanding state, the lower edge 18 of the flange 16 is supported by and in contact with the upper surface 142 of the bracket 10, and the bottom side 42 of the flange 16 is engaged with an extending portion 141 formed by a pressing process of bottom side 42 against the interior sidewall 143 of extending portion 141. Simultaneously, the top side 40 of flange 16 is pressed against the upper portion 30 of the interior side wall of bracket 10. The result is that disk drive K2 can stand securely in an upright position at angle theta from the vertical. In addition, a coupling hole 26 is provided on the bracket 8 so as to fix an expanding circuit board 261 mounted on the outer surface of the bracket 8.

As described above, in the disk drive mounting structure according to the present invention, since the guide rail 12 is provided on the bracket 8, the disk drive K1 can be slidably mounted thereon, providing an easy disassembling process. In addition, as shown in FIG. 4, the disk drive K2 can be maintained in an opened position (ie. an upstanding position) by being rotated toward the outer side. It is therefore easy to repair or upgrade the main board disposed under the disk drive K2.

It may be seen that this provides a computer chassis housing a multiple number of disk drives where only some are rotatably inserted while others are secured by guide rails. Implementation of these principles provides a rotatably mounted disk drive assembly design where the disk drive pivots about a mounting bracket, allowing for better access to other electrical components when the rotatably mounted disk drive is in an upright position.

What is claimed is:

1. A personal computer, comprising:
   a chassis having a front panel and a rear panel;
   a first and a second of longitudinal bracket, each positioned between said front panel and said rear panel, a first and a second guide rail formed on both said first and said second longitudinal brackets respectively near said front panel of said chassis;
   said first disk drive slidably carried on said first and second guide rails, said first disk drive having a left and a right side, said left and right side supported by said first and said second guide rails respectively; and
   a second disk drive positioned between said first and said second longitudinal brackets near said rear panel of said chassis, said second disk drive containing a first end and a second end opposite to said first end, said first end pivotally attached to said second longitudinal bracket and said second end fixedly attachable to said first longitudinal bracket, allowing said second disk drive to be rotated between a horizontal position and an upright position, providing easy access to electrical components located underneath said second disk drive.

2. The personal computer of claim 1, further comprising:
   a first flange protruding from said first end of said second disk drive, said first flange having a top side, a bottom side, and a protruding edge; and
   said second longitudinal bracket being hollow, further comprising a top side, a bottom side, an outer side, an inner side, an interior surface and an exterior surface, said inner side containing a longitudinal aperture to accommodate the insertion and the rotation of said first flange protruding from said first end of said second disk drive.

3. The personal computer of claim 2, further comprising:

a second flange protruding from said second end of said second disk drive, said second flange perforated by a pair of screw holes and a pair of lug holes to accommodate a pair of locking lugs; and said first longitudinal bracket having an inner side and an outer side, a plate extending from said inner side of said first longitudinal bracket near said rear panel for supporting said second flange of said second disk drive when said second disk drive is rotated to said horizontal position, said plate containing a pair of screw holes that coincide with said pair of screw holes that perforate said second flange of said second disk drive when said second disk drive is rotated to said horizontal position, said plate further comprising a pair of locking lugs that are sized and positioned to fit into said pair of lug holes in said second flange when said second disk drive is pivoted to said horizontal position.

4. The personal computer of claim 2, wherein said inner side of said second longitudinal bracket comprises, from top side to bottom side, an upper vertical flat portion on said exterior surface, an aperture to accommodate for the insertion and rotation of said first flange beneath said upper vertical flat portion, a catch surface on said interior surface of said second longitudinal bracket located beneath said aperture, and a horizontal support surface formed on said interior surface of said second longitudinal bracket just below said catch surface, when said second disk drive is rotated to said upright position, said second disk drive remains stationary in said upright position by:

having said protruding edge of said first flange of said second disk drive rest on said horizontal support surface formed on said interior surface of said second longitudinal bracket;

having said top side of said first flange of said second disk drive rest against said upper vertical flat portion on said exterior surface of said second longitudinal bracket; and having a portion of said bottom side of said first flange, between where said first flange contacts said upper vertical flat portion and where said first flange contacts said horizontal support surface, being pressed up against said catch surface found on said interior surface of said second longitudinal bracket.

5. The personal computer of claim 4, wherein said outer side of said first longitudinal bracket contains a coupling hole to fix an expanding circuit board on the outer surface of said first longitudinal bracket.

6. A method of removing a disk drive from a personal computer, comprising:

unfastening a first end of said disk drive from a first longitudinal bracket;

lifting said first end of said disk drive from said first longitudinal bracket;

rotating said first end of said disk drive about a second end of said disk drive opposite to said first end of said disk drive, said second end pivotally attached to a second longitudinal bracket;

continuing to rotate said first end of said disk drive about said second end of said disk drive causing said first end to move away from a centre to a side of said personal computer and causing said first end to pass over said second end of said disk drive until the rotation is forced to stop at a point just beyond where said disk drive becomes vertical; and removing said second end of said disk drive from said second longitudinal bracket by lifting a flange protruding from said second end of said disk drive from an aperture in said second longitudinal bracket.

7. The process of claim 6, when said unfastening comprises:

unscrewing and removing a pair of screws holding said first end of a disk drive to said first longitudinal bracket; and separating a pair of lugs extending from said first bracket from a pair of lug holes located at said first end of said disk drive.

8. A method of attaching a disk drive to a personal computer, comprising:

inserting a first flange protruding from a first end of said disk chive into an aperture formed in a first longitudinal bracket;

rotating a second end of said disk drive opposite said first end of said disk drive about said first end of said disk drive positioned in said first longitudinal bracket from an upright position to a horizontal position causing said second end of said disk drive to move from a periphery to a center portion of said personal computer; and fastening said second end of said disk drive to a second longitudinal bracket.

9. The method of claim 8, where said fastening of said second end of said disk drive to said second longitudinal bracket comprises:

inserting and screwing a pair of screws into screw holes to hold said second end of said disk drive to said second longitudinal bracket; and inserting a pair of lugs extending from said second bracket into a pair of lug holes located at said second end of said disk drive.

10. A personal computer, comprising:

a first disk drive and a second disk drive physically discrete from said first disk drive;

a chassis formed by front and rear plates held structurally apart by first and second longitudinal brackets rigidly extending between said front and rear plates;

adjacent first portions of each of said first and second brackets forming a plurality of spaced-apart guide rails to slidably support said first disk drive within said personal computer;

a second portion of said first longitudinal bracket providing a first latch; and a second portion of said second longitudinal bracket providing a second latch spaced-apart from said first latch and engaging a first side of said second disk drive while a second and opposite side of said second disk drive is held stationary by said first latch with said second disk drive lying in a first orientation within said chassis, and said second latch engaging said first side of said second disk drive and supporting the entirety of said second disk drive in an upright position while said second disk drive is spaced-apart from said first latch.

11. The personal computer of claim 10, with said second disk drive comprising:

a first flange extending distally outwardly from said first side of said disk drive, rotatably received by said second latch; and a second flange extending distally outwardly from said second side of said disk drive, mating with said first latch.

12. The personal computer of claim 11, comprised of a lug extending between said first latch and said second flange while said second disk drive lies in said first orientation.

13. The personal computer of claim 11, with said first flange and said second flange lying within a single plane defining an outer surface of said second disk drive.

14. The personal computer of claim 23, with said second disk drive comprising:

said first flange protruding from said first side of said second disk drive, said first flange containing a proximal portion where said first flange joins said second disk drive and a distal portion of said first flange extends farthest from said proximal portion, said first flange containing a top surface and a bottom surface, said top surface being positioned farthest from said first latch than said bottom surface while said second disk drive is rotated from said first orientation to said upright position;

said second latch being formed from said second portion of said second longitudinal bracket having a member extending convexly toward said second disk drive with an exterior surface facing said second disk drive and an interior surface separated by said member from said exterior surface, and from said second portion being perforated by an aperture accommodating both insertion of said first flange through said member and rotation of said first flange within said member; and said top surface engaging said exterior surface and said bottom surface engaging said interior surface while said second disk drive is in said upright position.

15. The personal computer of claim 10, with said second disk drive comprising:

a first flange protruding from said first side of said second disk drive, said first flange containing a proximal portion where said first flange joins said second disk drive and a distal portion of said first flange extends farthest from said proximal portion, said first flange containing a top surface and a bottom surface, said top surface being positioned farthest from said first latch than said bottom surface while said second disk drive is rotated from said first orientation to said upright position;

said second latch being formed from said second portion of said second longitudinal bracket having a member extending convexly toward said second disk drive with an exterior surface facing said second disk drive and an interior surface separated by said member from said exterior surface, and from said second portion being perforated by an aperture accommodating both insertion of said first flange through said member and rotation of said first flange within said member; and said top surface engaging said exterior surface and said bottom surface engaging said interior surface while said second disk drive is in said upright position.

16. The personal computer of claim 15, comprised of said second latch engaging said first side of said second disk drive and supporting the entirety of said second disk drive in an upright position while said second disk drive is spaced-apart from said first latch with an orientation of said second disk drive greater than ninety degrees from said first orientation.

17. The personal computer of claim 10, comprised of said second latch engaging said first side of said second disk drive and supporting the entirety of said second disk drive in an upright position while said second disk drive is spaced-apart from said first latch with an orientation of said second disk drive greater than ninety degrees and less than one hundred and thirty-five degrees from said first orientation.

18. A personal computer, comprising:

a chassis including front and rear plates and first and second longitudinal brackets fixedly disposed between the front and rear plates;

guide rails formed on a front side of each the first and second brackets to slidably carry a first disk drive on the guide rails; and rotating means for rotating and carrying a second disk drive on a rear side of each the first and second brackets.

19. The personal computer of claim 18, wherein the rotating means comprises an inserting flange and a locking flange formed respectively on opposite sides of the second disk drive, a longitudinal hole formed on the second bracket into which the inserting flange is rotatably inserted, and a locking lug and hole combination formed on the locking flange and the first bracket.

20. The personal computer of claim 19, wherein a lower side of the longitudinal hole of the second bracket is pressed toward an inside to accommodate a longitudinal protrusion.

21. The personal computer of claim 18, wherein the first bracket is provided with one or more coupling holes for fixing an expanding circuit board mounted on one side of the first bracket.

* * * * *